United States Patent [19]

Pedersen et al.

[11] 3,999,571
[45] Dec. 28, 1976

[54] PRESSURE RELIEF VALVES

[75] Inventors: Hans Henrik Pedersen; Emil Aarestrup Sørensen, both of Hvidovre, Denmark

[73] Assignee: Pres-Vac A/S, Allerod, Denmark

[22] Filed: July 29, 1975

[21] Appl. No.: 600,111

[52] U.S. Cl. .................... 137/533.17; 114/212; 137/516.25; 220/203; 239/454

[51] Int. Cl.[2] ........................... F16K 15/02

[58] Field of Search ........ 137/533, 533.17, 516.25; 239/452, 453, 454; 114/212, 211; 220/203

[56] References Cited
UNITED STATES PATENTS

| | | | |
|---|---|---|---|
| 2,602,005 | 7/1952 | Weldy | 239/453 |
| 2,815,247 | 12/1957 | Hogeman | 239/453 |
| 3,095,153 | 6/1963 | Soth | 239/453 X |
| 3,285,300 | 11/1966 | Mistarz | 239/453 X |
| 3,557,740 | 1/1971 | Pratt | 220/203 X |

Primary Examiner—Robert G. Nilson
Attorney, Agent, or Firm—Watson, Cole, Grindle & Watson

[57] ABSTRACT

A pressure relief valve, e.g. for oil tankers comprising a valve housing, in the interior of which there is provided a valve seat for an upwardly opening valve body which carries a drop-shaped throttling member located in a flow-off opening at the top of the valve housing at a distance from the valve seat.

2 Claims, 1 Drawing Figure

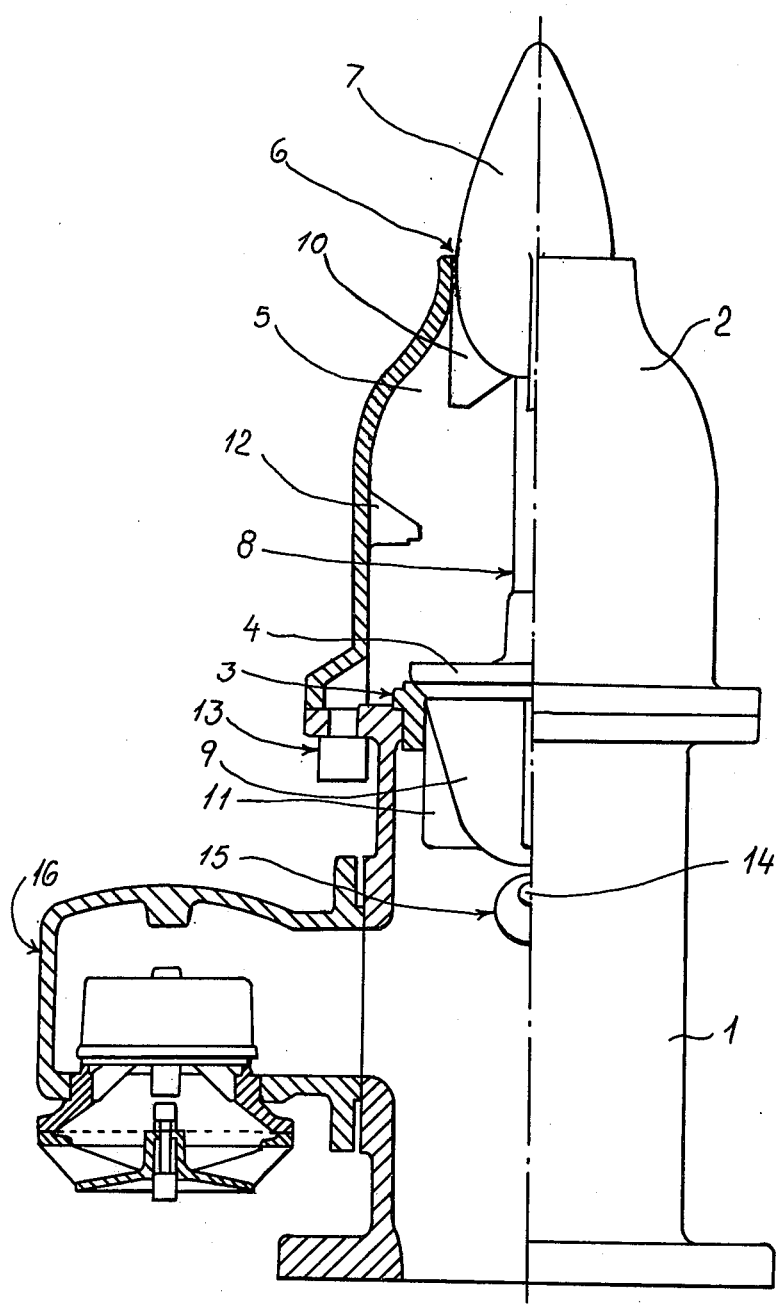

PRESSURE RELIEF VALVES

BACKGROUND OF THE INVENTION

The invention relates to a pressure relief valve of the kind used for pressure equalization between a closed space and the surrounding atmosphere. Such pressure relief valves are e.g. used for tanks or receptacles for volatile liquids or for closed compartments for the purpose of keeping these sealed from the atmosphere under normal conditions and breaking this seal to permit pressure equalization only when the pressure within the receptacle or compartment exceeds the outside pressure by a predetermined amount.

A particularly important field of use of such pressure relief valves is for oil tankers, and in the following the invention will therefore be described with particular reference to this field of use, though it will be realized that the pressure relief valve according to the invention may also be used within other fields where similar problems exist. It is observed, also, that the pressure relief valve may, if desired, in well-known manner be combined with a vacuum valve so that pressure equalization may take place for both increasing and decreasing pressure relative to the surrounding atmosphere.

It is customary to construct a pressure relief valve of the kind referred to with a valve body which in the closed state of the valve engages an upwardly facing valve seat under the influence of its gravity, which may of course be supplemented by a spring force, if desired, though it is generally preferred to avoid springs, if possible. When the pressure below the valve seat exceeds that of the surrounding atmosphere by a certain amount, the valve body is lifted from the seat whereby gas is permitted to escape to establish pressure equalization. If such a valve seat and valve body are arranged at the top of a valve housing connected to the closed space, the gas escaping through the valve will have a tendency to spread radially outwards. The spreading of the escaping gas in relatively low height e.g. above a ship's deck may particularly in calm weather give rise to danger of fire and poisoning.

A more advantageous flow-off may be obtained by arranging an inwardly opening valve body at the top of the valve housing, but in that case the mechanical arrangement will be more complicated.

SUMMARY OF THE INVENTION

It is the object of the invention to provide a simple pressure relief valve based on an upwardly opening valve body and having advantageous flow-off characteristics so as to reduce the danger of the accumulation of escaped gases at a low level above the valve.

According to the invention, a pressure relief valve for pressure equalization between a closed space and the surrounding atmosphere comprises a valve housing, an upwardly facing valve seat in said valve housing, a valve body co-operating with said valve seat and adapted to be lifted therefrom under the influence of excess pressure in the space below said valve seat, said valve housing being constructed to form a flow-off chamber above said valve seat, a flow-off opening being provided at the top of said valve housing, a drop-shaped throttling member being arranged in said flow-off opening and being connected with said valve body in such a manner as to be lifted and lowered together therewith, the position of said throttling member being so selected that its maximum diameter is located substantially in said flow-off opening when said valve body is in its closing position.

By this arrangement of the valve the advantage is obtained that owing to the aerodynamic shape of the throttling member the flow-off through the top of the valve housing will take place in the form of an upwardly directed jet which will have approximately the same speed of flow irrespective of the rate of escape of the gas, because the throttling member liberates the flow-off opening the more, the more the pressure in the closed space exceeds that of the surrounding atmosphere.

With particular advantage said valve body may be constructed with a downwardly extending plug portion, the shape of which is so related to the axial contour of said throttling member that upon lifting of said valve body the passage area through said valve seat increases in similar manner as the passage area between said throttling member and the edge of said flow-off opening. Hereby the constancy of the speed of flow of the escaping gas is additionally improved.

BRIEF DESCRIPTION OF THE DRAWING

The single FIGURE of the drawing shows a pressure relief valve according to one embodiment of the invention, in side view and partly in section.

DESCRIPTION OF THE PREFERRED EMBODIMENT

The pressure relief valve has a valve housing, which consists of a lower part 1 and an upper part 2, of which the former is provided at its upper end with a valve seat 3 for an upwardly opening valve body 4. The upper part 2 of the valve housing forms a flow-off chamber 5, which at its top has a flow-off opening 6 in which there is arranged a drop-shaped throttling member 7, which through a rod 8 is connected with the valve body 4. The valve body 4 is constructed with a downwardly extending plug portion 9 with downwardly decreasing cross sectional area. The throttling member is guided in the flow-off opening 6 by means of guiding ribs 10, and the valve body 4 is guided in the valve seat 3 by means of guiding ribs 11. The lifting of the valve body is limited by means of end stops 12. 13 is a drain for the upper part of the valve housing, and 14 is a spindle for manual lifting of the valve body by means of an eccentric 15. A vacuum valve unit 16 of a type known per se is connected to the lower part 1 of the valve housing.

When the valve body 4 is in the closing position, the maximum diameter of the throttling member 7 is located in or very close to the flow-off opening 6 and this maximum diameter is so selected that in this position there is only a very narrow slot between the throttling member 7 and the edge of the flow-off opening 6. When the valve body 4 is lifted by a pressure exceeding that of the surrounding atmosphere, the throttling member 7 is likewise lifted so that the slot between the throttling member and the edge of the flow-off opening 6 becomes wider. The shape of the plug portion 9 of the valve body 4 and contour of the throttling member 7 are so adjusted to one another that upon lifting of the valve body the passage area through the valve seat 3 increases in similar manner as the passage area between the throttling member 7 and the edge of the flow-off opening 6. Since the lifting of the valve body 4 and therefore also of the throttling member 7 is determined by the excess pressure, both passage areas will be substantially proportional to the quantity of gas escaping per time unit so that the flow-off speed through the slot around the throttling member will be substantially constant. Owing to the aerodynamic shape of the throttling member, the gas will be concentrated towards the center and will form a powerful upwardly directed jet which has great speed, e.g. of the order of size of 100 m per second, even if the rate of escape of the gas is relatively small. In this manner the danger of the accumulation of inflammable and/or poisonous vapors e.g. above a ship's deck is reduced to a minimum.

We claim:

1. A pressure relief valve for pressure equalization between a closed space and the surrounding atmosphere comprising a valve housing, an upwardly facing valve seat in said valve housing, a valve body co-operating with said valve seat and adapted to be lifted therefrom under the influence of excess pressure in the space below said valve seat, said valve housing being constructed to form a flow-off chamber above said valve seat, a flow-off opening being provided at the top of said valve housing, a drop-shaped throttling member being arranged in said flow-off opening and being connected with said valve body in such a manner as to be lifted and lowered together therewith, the position of said throttling member being so selected that its maximum diameter is located substantially in said flow-off opening when said valve body is in its closing position while the tipped end of said throttling member projects outwardly of said opening.

2. A pressure relief valve as in claim 1, in which said valve body is constructed with a downwardly extending plug portion, the shape of which is so related to the axial contour of said throttling member that upon lifting of said valve body the passage area through said valve seat increases in similar manner as the passage area between said throttling member and the edge of said flow-off opening.

* * * * *